United States Patent [19]
Forsythe

[11] Patent Number: 5,928,320
[45] Date of Patent: Jul. 27, 1999

[54] TRANSACTION TERMINAL WITH MODULAR DISPLAY

[75] Inventor: Donald L. Forsythe, Dacula, Ga.

[73] Assignee: NCR Corporation, Dayton, Ohio

[21] Appl. No.: 08/660,690

[22] Filed: May 30, 1996

[51] Int. Cl.[6] .................................................. G06F 17/00
[52] U.S. Cl. ...................... 708/708.1; 361/681; 361/736
[58] Field of Search ................................ 345/1, 3, 204; 361/681, 736, 748; 364/708.1; 705/16, 17, 24

[56] References Cited

U.S. PATENT DOCUMENTS

| | | | |
|---|---|---|---|
| D. 346,594 | 5/1994 | Skaggs et al. | D14/113 |
| D. 357,495 | 4/1995 | Skaggs et al. | D18/4 |
| 5,262,759 | 11/1993 | Moriconi et al. | 361/681 |
| 5,347,630 | 9/1994 | Ishizawa et al. | 345/509 |
| 5,546,098 | 8/1996 | Moriconi | 345/3 |
| 5,608,863 | 3/1997 | Ishizawa et al. | 345/501 |
| 5,727,162 | 3/1998 | Nakamura | 705/25 |

*Primary Examiner*—Edward R. Cosimano
*Attorney, Agent, or Firm*—Francis L. Conte

[57] ABSTRACT

A transaction terminal includes a modular controller having a back housing containing a processor main board covered by a front cover removably mounted to the housing. An accessory board is disposed inside the front cover and includes a display driver removably operatively joined to the main board for communicating data therebetween. The cover is interchangeable with different front covers for effecting a variety of different transaction terminal displays.

18 Claims, 9 Drawing Sheets

TRANSACTION TERMINAL WITH MODULAR DISPLAY

BACKGROUND OF THE INVENTION

The present invention relates generally to point of sale transaction terminals, and, more specifically, to a modular transaction terminal.

A typical transaction terminal used in a retail outlet includes a keyboard, display, printer, cash drawer, and electronic control unit in the form of separate modules that can be clustered or organized in suitable arrangements at a sales counter. This allows the ergonomic layout of the modules to be arranged as desired for accommodating the specific limitations of individual sales counters.

The control unit is typically manufactured with its own housing and is typically sized for being stacked together with the cash drawer and other components thereabove in a relatively small footprint for conserving space. The various modules of the terminal are operatively joined together using various external electrical cables and connectors which must be suitably routed and safeguarded from damage.

Although the typical modular transaction terminal provides flexibility in arrangement, the many components thereof must be separately manufactured, and separately designed for the various types of retail applications. Printers, cash drawers, and displays may take various forms. For example, displays may be in the form of cathode ray tubes (CRTs), or substantially flat screens using vacuum florescence or liquid crystal display (LCD) technology. A separate keyboard may be used, or key input may be directly integrated with the screen in the form of a conventional LCD touchscreen. The displays may be base mounted, or post mounted, and are preferably adjustable in viewing angle.

It is desirable to reduce the proliferation of separate modules, connectors, and external cables winding through the workspace and into the control unit. It is also desirable to reduce the number of different terminal components which must be manufactured, while at the same time maintaining flexibility and variety in the number of available displays and mounting arrangements.

SUMMARY OF THE INVENTION

A transaction terminal includes a modular controller having a back housing containing a processor main board covered by a front cover removably mounted to the housing. An accessory board is disposed inside the front cover and includes a display driver removably operatively joined to the main board for communicating data therebetween. The cover is interchangeable with different front covers for effecting a variety of different transaction terminal displays.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
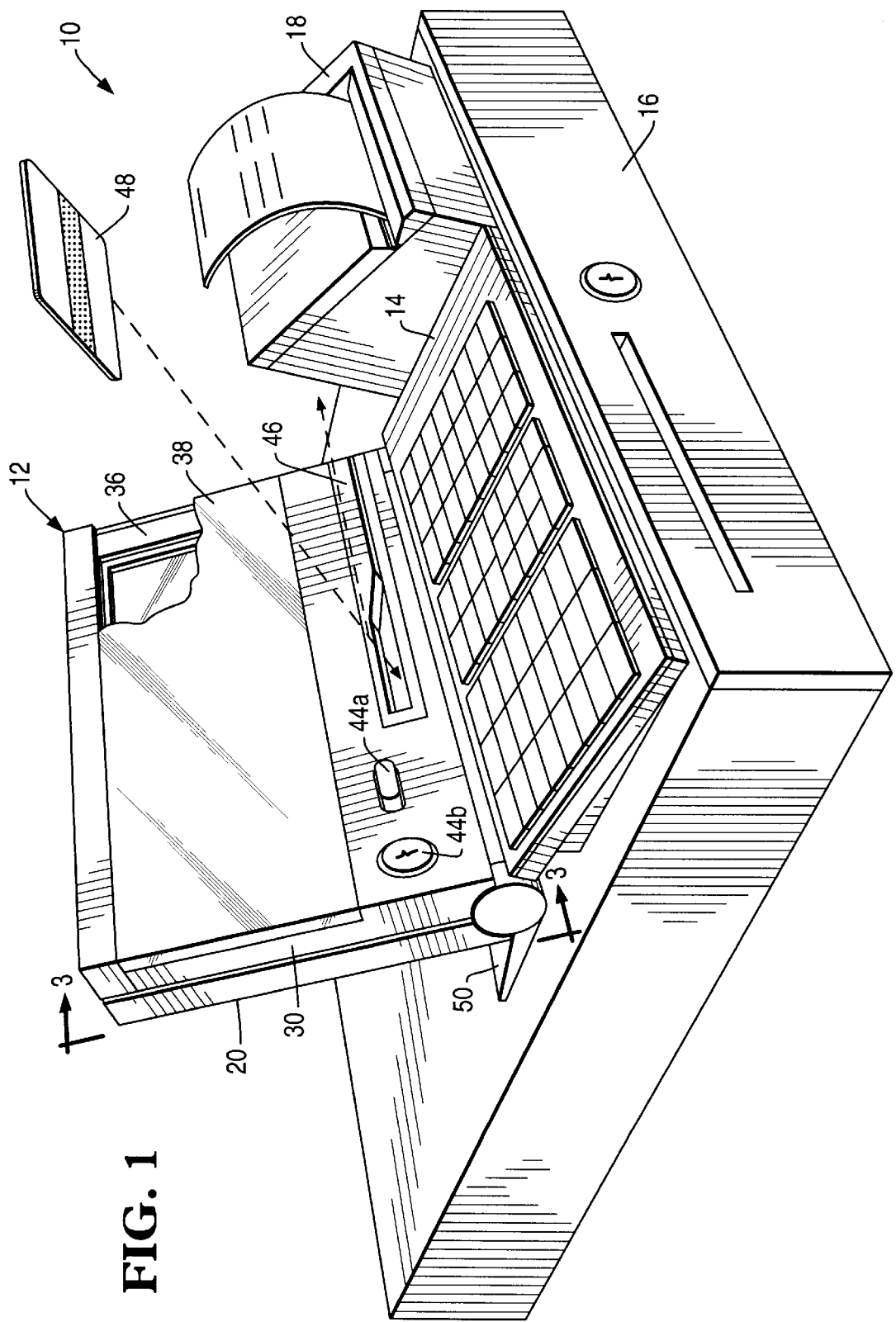
FIG. 1 is an isometric view of an exemplary transaction terminal including a modular controller having one type of integral display therein.

Illustrated schematically in FIG. 1 is an exemplary point-of-sale transaction terminal 10 in accordance with one embodiment of the present invention. The terminal 10 is an assembly of modular components including a terminal controller 12 which is an electronics unit with its own modular components which controls operation of the entire terminal 10 including a conventional keyboard 14, a conventional cash drawer 16, and a conventional transaction printer 18.

Figure 2:
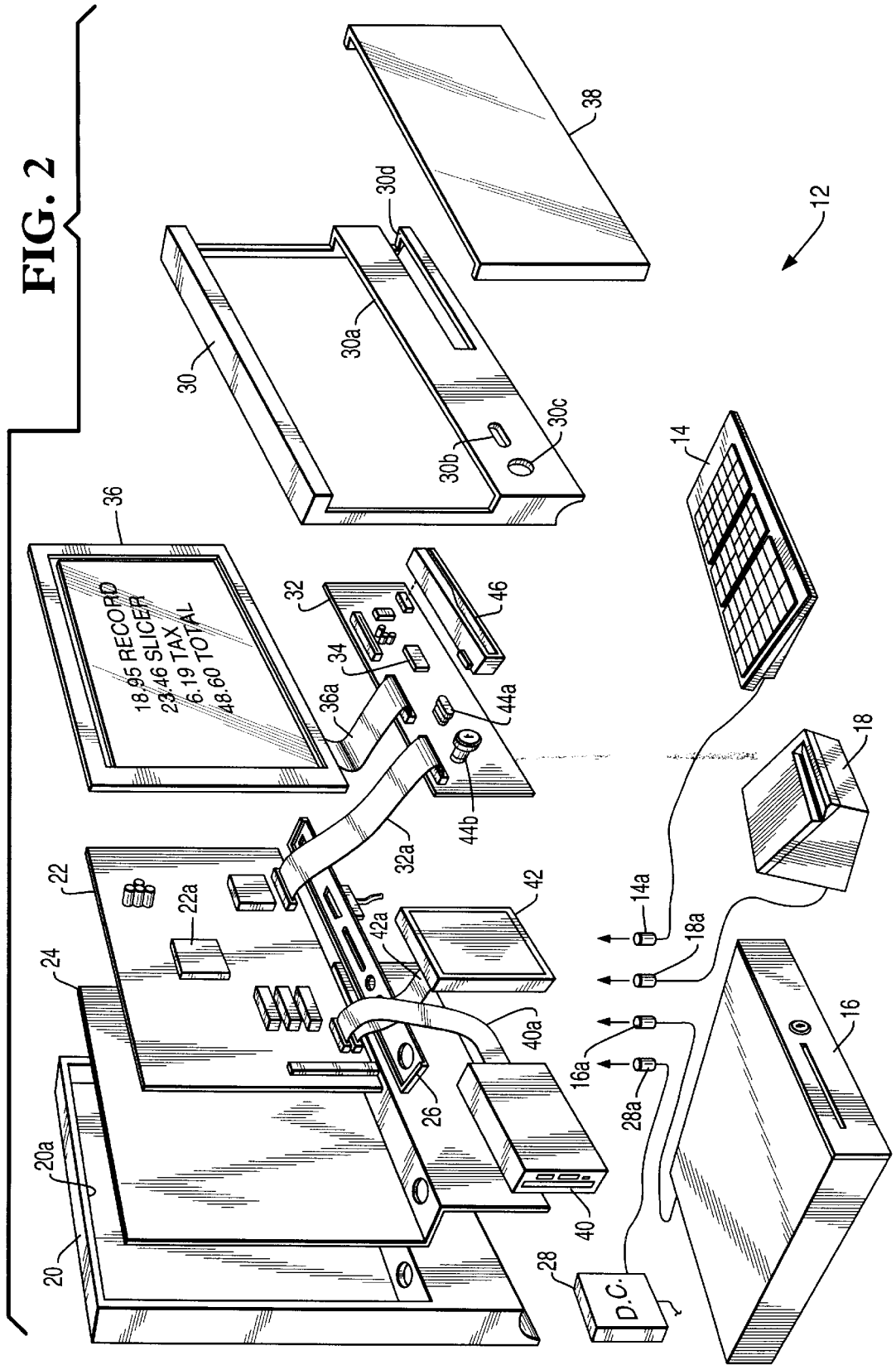
FIG. 2 is a schematic, partly exploded view of the transaction terminal illustrated in FIG. 1.

Referring also to FIG. 2, the terminal controller 12 includes a back housing 20 in the form of a generally rectangular box having a front opening 20a, and is formed of any suitable material such as plastic. A main processor printed circuit board 22 is preferably fixedly mounted to a back plate or frame 24 and suitably collectively mounted inside the housing 20 in any suitable manner such as by using removable screws. The main board 22 may take any suitable form and includes a conventional digitally programmable central processing unit (CPU) 22a along with any conventional ROM and RAM memory and coprocessors as desired for use in effecting a typical point-of-sale terminal for providing written receipts of sales transactions, as well as providing inventory control and other known functions as desired.

A conventional connector board 26 is suitably fixedly and operatively joined to the main board 22 in the housing 20 for providing convenient access to connect all required external electrical cables to the main board 22. For example, each of the keyboard 14, cash drawer 16, and printer 18 have respective electrical cables with suitable connectors 14a, 16a, and 18a, respectively, which are removably joinable to corresponding connectors mounted to the connector board 26 for operatively joining these components thereto. A suitable DC power supply 28 has a corresponding cable and connector 28a which is also operatively joined to a corresponding connector mounted on the connector board 26 for providing power to the terminal controller 12 and its associated components. And, additional cables and connectors may be used to join the connector board 26 to other terminals, or central terminal, or for modem communication through phone lines.

In accordance with one embodiment of the present invention, the controller 12 includes a front cover 30 suitably removably mounted to the housing 20, by screws for example, and configured for enclosing the entire front opening 20a of the housing 20. Also in accordance with the present invention, an accessory printed circuit board 32 is suitably disposed inside the front cover 30, and includes a conventional display driver or processor 34. The accessory board 32 is removably operatively joined to the main board 22 for communicating data therebetween. The accessory board 32 may take any suitable form, and may be fixedly joined to either the front cover 30 or the main board 22, by screws for example.

The front cover 30 includes a main window or aperture 30a in which is suitably mounted a visual electrical display or screen 36. The display 36 may take any conventional form, with the display driver 34 also taking any conventional form for suitably driving the display 36 to display thereon characters or pixels as required for the specific point-of-sale terminal requirements.

In accordance with the present invention, the main board 22 in the back housing 20 is configured in a standard or common configuration, with the main board 22 including all required electronic components and processing integrated circuit (IC) chips for use in controlling the various configurations of the display 36 with cooperating peripherals such as the keyboard 14, cash drawer 16, and printer 18, for example. The front cover 30, display 36, and accessory board 32 may be varied in configuration as desired to change the appearance and function of the terminal 10 to accommodate the variety of displays required in the various point-of-sale requirements of different retailers. By changing simply the front cover 30 and display 36 associated therewith, the entire front appearance and function of the controller 12 may be changed with relatively few modifications, and without the need for manufacturing a specific or unique terminal controller for each different display application. The common main board 22 is used in all display applications, which may be varied by simply changing the required front cover 30 and display 36, and the accessory board 32 if required. Repair and maintenance of the terminal controller 12 are also simplified since the front cover 30 and display 36 may be simply removed for repair or replacement of the readily accessible components therein.

Figure 3:
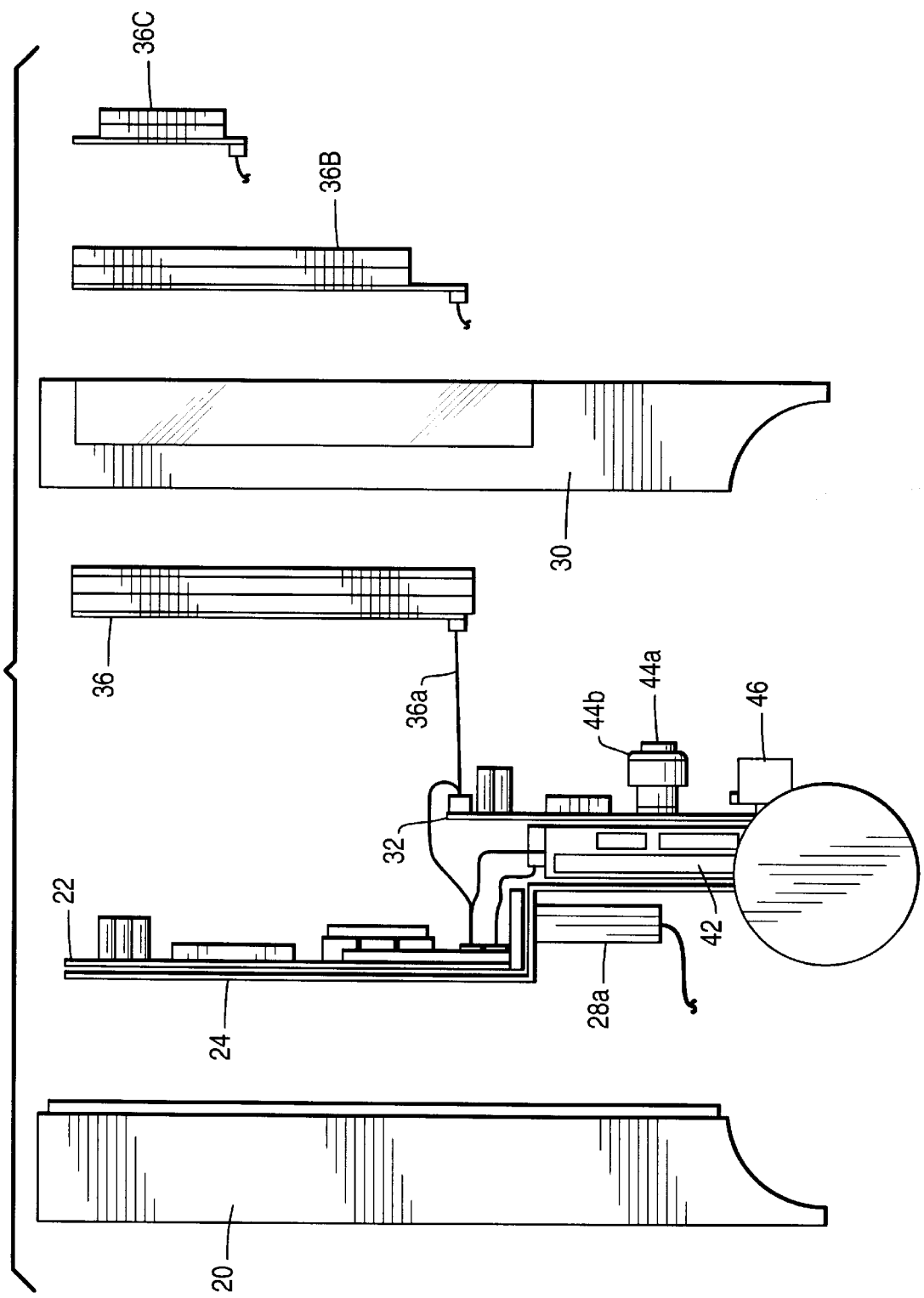
FIG. 3 is a partly sectional and exploded view of the modular controller illustrated in FIG. 1 and taken generally in the direction of line 3—3 showing one type of integral display, along with two additional interchangeable displays.

In the exemplary embodiment illustrated in FIGS. 1 and 2, the display 36 is in the form of a conventional nine or ten inch LCD display. FIG. 3 illustrates that the LCD display 36 may be readily interchanged with a different display such as a conventional LCD touch screen display 36B, or a smaller limited character display such as a two (2) row by twenty (20) character vacuum florescent or LCD display 36C. The interchangeable displays may either be mounted to a common front cover 30, or with different front covers as described hereinbelow for effecting a variety of different transaction terminal displays in accordance with one advantage of the present invention.

Referring again to FIG. 2, each display 36 includes a conventional electrical ribbon cable 36a which may take any standard form with an end connector being suitably removably joined to a corresponding connector mounted on the accessory board 32. In this way, the display 36 may simply be joined to the accessory board 32 by a simple plug arrangement which operatively joins the display 36 thereto. In turn, the accessory board 32 includes a conventional ribbon cable 32a which may take any standard form for operatively joining the accessory board 32 to the main board 22, with the accessory cable 32a having suitable end connectors which plug together with corresponding connectors suitably mounted to respective ones of the accessory board 32 and main board 22.

In operation, the CPU 22a is suitably programmed to control all functions of the transaction terminal 10 including the images presented on the display 36. Data is communicated from the main board 22 through the accessory cable 32a to the accessory board 32, and in turn through the display driver 34 operatively joined to the display 36 for producing the desired images thereon. If desired, a conventional light filter or screen 38 as shown in FIGS. 1 and 2 may be suitably mounted on the front cover 30 over the display 36 for reducing glare and improving comfort of viewing of the display image.

Figure 4:
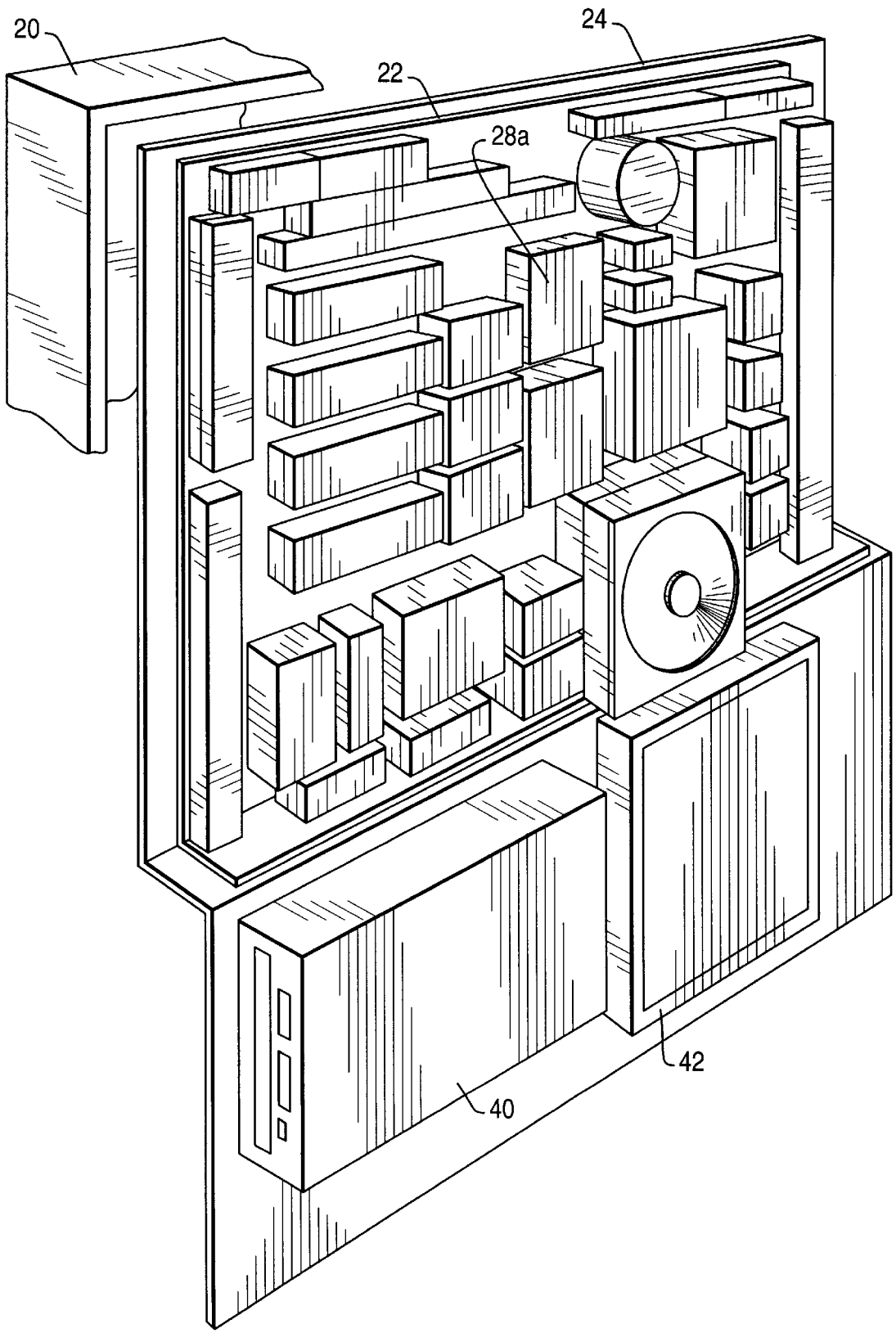
FIG. 4 is an isometric, elevational view of a portion of the modular controller illustrated in FIG. 2 in accordance with an exemplary embodiment.

FIG. 4 illustrates a specific embodiment of the main board 22 attached to its back frame 24 and mounted within the housing 20, only a portion of which is shown. As indicated above, the main board 22 may take any conventional form including all suitable IC chips as desired. Conventional memory in the form of ROM and RAM may be provided as desired. In the exemplary embodiment illustrated in FIGS. 2 and 4, the terminal controller 12 further includes conventional load devices or memory disk drives for providing large data storing capability as desired. For example, a conventional removable floppy diskette drive 40 is operatively joined to the main board 22 through a corresponding ribbon cable 40a. A conventional hard disk drive 42 is also operatively joined to the main board 22 through a corresponding ribbon cable 42a, with a common removable connector at the distal end of the two cables 40a and 42a being plug mounted into a corresponding connector mounted on the main board 22. The disk drives 40, 42 are suitably mounted in the housing 20, to the back frame 24 for example.

To control operation of the terminal 12 by a user, it is desirable to locate control components on the face of the front cover 30. For example, the terminal controller 12 as illustrated in FIGS. 1 and 2 preferably includes a plurality of electrical switches mounted to the front cover 30 and operatively joined to the accessory board 32 for controlling operation of the main board 22. A simple on-off power switch 44a is conventionally configured and conventionally joined to the accessory board 32 and protrudes through a corresponding hole 30b in the front cover 30. A second or mode switch 44b is conventionally configured for operation by a corresponding key, and is conventionally joined to the accessory board 32 and protrudes through a corresponding hole 30c in the front cover 30.

The mode switch 44b is conventionally operatively joined to the main board 22 through the accessory board cable 32a for controlling authorized access to different operating functions of the main board 22. For example, the mode switch 44b may have a first position allowing use of the transaction terminal 12 by a clerk with limited functional capability as specified within the software contained in the CPU 22a; with a second position of the switch 44b allowing access by a manager to more, if not all, of the control functions programmed into the terminal 12 as is conventionally known.

It is also desirable to include a conventional magnetic stripe card reader (MSR) 46 mounted to the front cover 30 through a corresponding aperture 30d therethrough. The MSR 46 is conventionally operatively joined to the accessory board 32 and is configured for reading data from a conventional magnetic stripe card 48 illustrated in FIG. 1 for processing by the main board 22. The MSR 46 includes a suitable driver operatively mounted on the accessory board 32 and is used in a conventional manner for reading the card 48, which may be a conventional credit card for effecting a credit card purchase transaction.

In the preferred embodiment illustrated in FIG. 1, for example, the front cover 30 and display 36 are a substantially flat, integrated assembly with the housing 20 and the main board 22 for providing a relatively compact terminal controller 12. The display 36, switches 44a, 44b, and MSR 46 all face the user for providing easy access thereto. And, if repair or maintenance is required, the front cover 30 is readily removable, by removing mounting screws for example, for providing direct front access to the inside of the housing 20 and the various components therein.

As shown in FIG. 1, the terminal controller 12 may be relatively small, using a standard 8 inch by 6 inch main board 22 therein for effecting a relatively small footprint. This allows the terminal controller 12 and integrated display 36 along with the keyboard 14 and printer 18 to be readily mounted directly atop the cash drawer 16 in a compact arrangement. In this embodiment, the keyboard 14 is a discrete component spaced closely adjacent to the modular controller 12, and operatively joined thereto through its corresponding cable and connector 14a as illustrated in FIG. 2.

The modular controller 12 with the common main board 22 within the housing 20 allows for many variations in functional and structural configuration of the cooperating front cover 30 and displays. In a simple embodiment, the front cover 30 may include only the desired switches and MSR 46 thereon which may be mounted on the side thereof so that the front cover 30 may be oriented horizontally for supporting a conventional CRT display supported thereon.

However, in the preferred embodiment illustrated in FIG. 1, the display 36 is directly integrated with the terminal controller 12 by being mounted through the front cover 30 in a generally vertical arrangement. In one embodiment illustrated in FIGS. 1–3, the display 36 is in the form of a conventional LCD display for presenting images of varying complexity from rows and columns of characters to graphics as desired.

Figure 5:
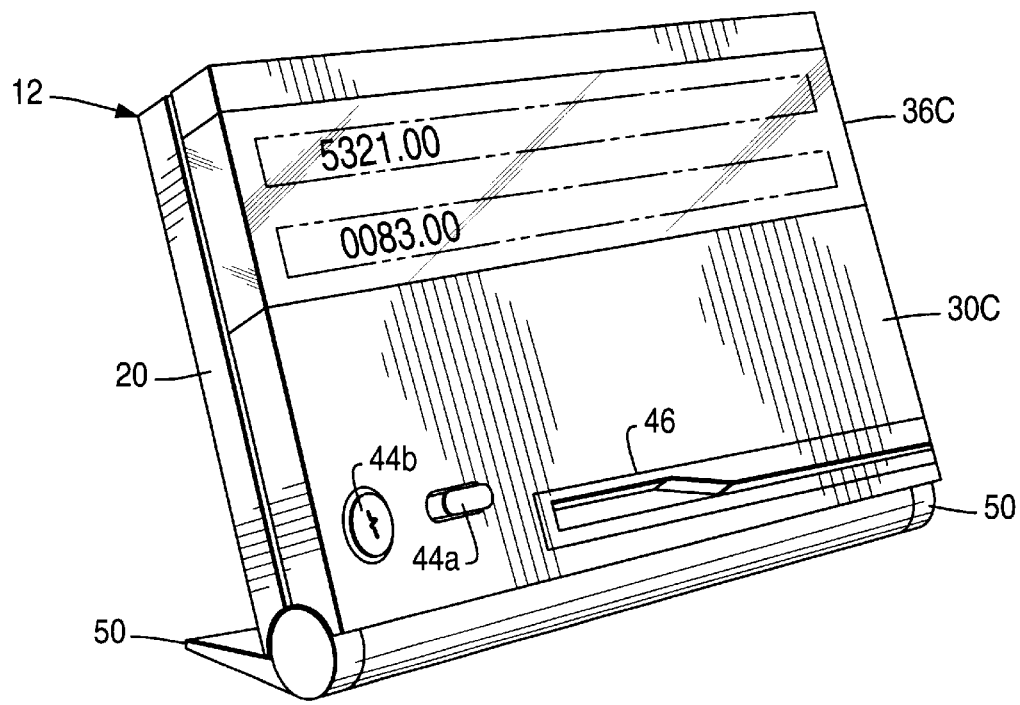
FIG. 5 is an isometric view of the modular controller illustrated in FIG. 1 including a second embodiment of the display therein.

FIG. 5 illustrates a simpler display 36C in the form of a conventional 2×20 character display using vacuum florescence or LCD for example. The front cover, designated 30C, is suitably configured for mounting the smaller display 36C but is otherwise similar in configuration to the front cover 30 illustrated in FIG. 1 including the switches 44a, 44b and the MSR 46. Internally, the accessory board 32 includes a display driver specifically configured for driving the two line display 36C.

Figure 6:
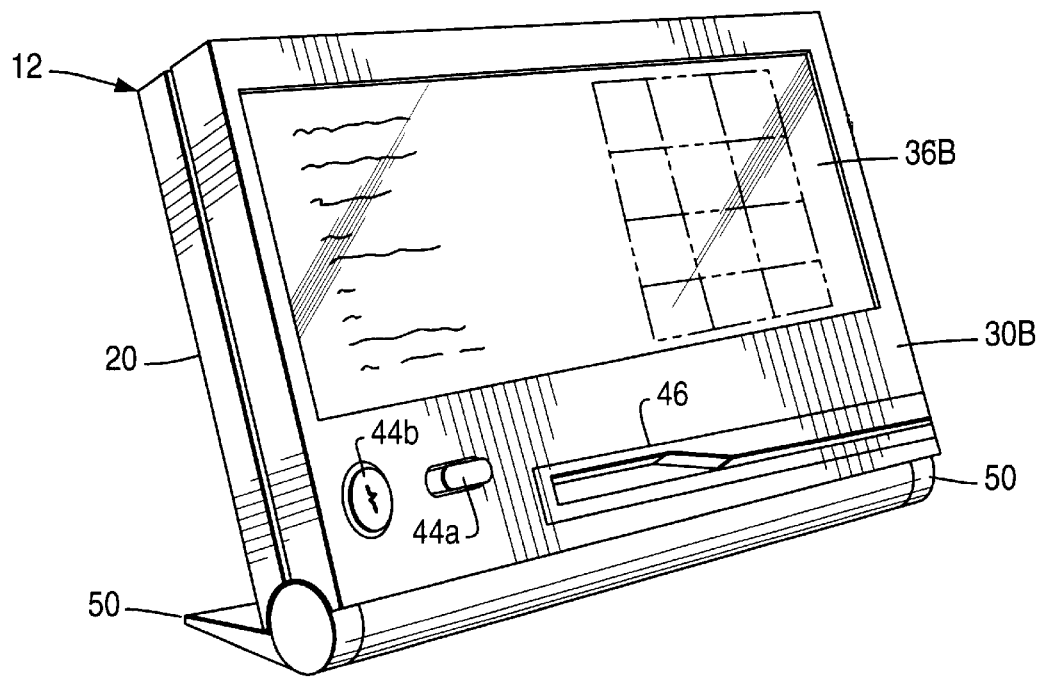
FIG. 6 is an isometric view of the modular controller illustrated in FIG. 1 including a third embodiment of the display therein.

In FIG. 6, the touch screen LCD display 36B is illustrated, with the front cover, designated 30B, being specifically configured for receiving the larger touch screen 36B but is otherwise similar in configuration with the front cover 30 illustrated in FIG. 1 including the switches 44a, 44b and the MSR 46. The accessory board 32 includes a suitable display driver configured for communicating the touch screen responses to the main board 22. In this way the separate keyboard 14 illustrated in FIG. 1 is not required and need not be connected to the terminal controller 12.

In the exemplary embodiment illustrated in FIGS. 1, 5, and 6, the respective housings 20, preferably also include a pair of identical base feet 50 suitably joined to the housing 20 at the lower end thereof for supporting the housing 20. The base feet 50 are suitably pivotable for adjusting the viewing angle of the several displays 36, 36B, 36C mounted on the corresponding housing covers. In these exemplary embodiments, the base feet are configured for supporting the terminal controller 12 and corresponding displays on a flat, horizontal surface.

Figure 7:
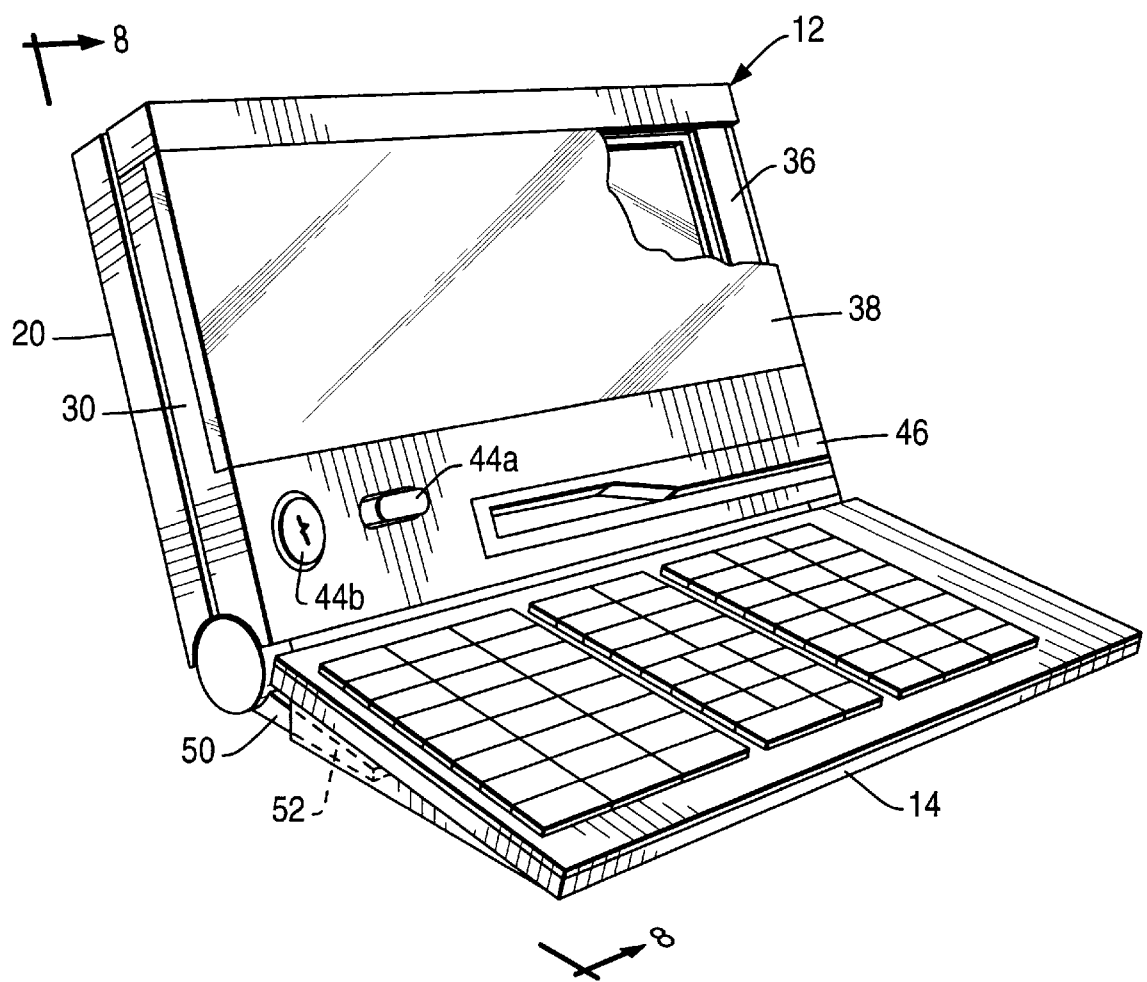
FIG. 7 is an isometric view of the modular controller illustrated in FIG. 1 integrally joined to a keyboard in another embodiment of the present invention.
Figure 8:
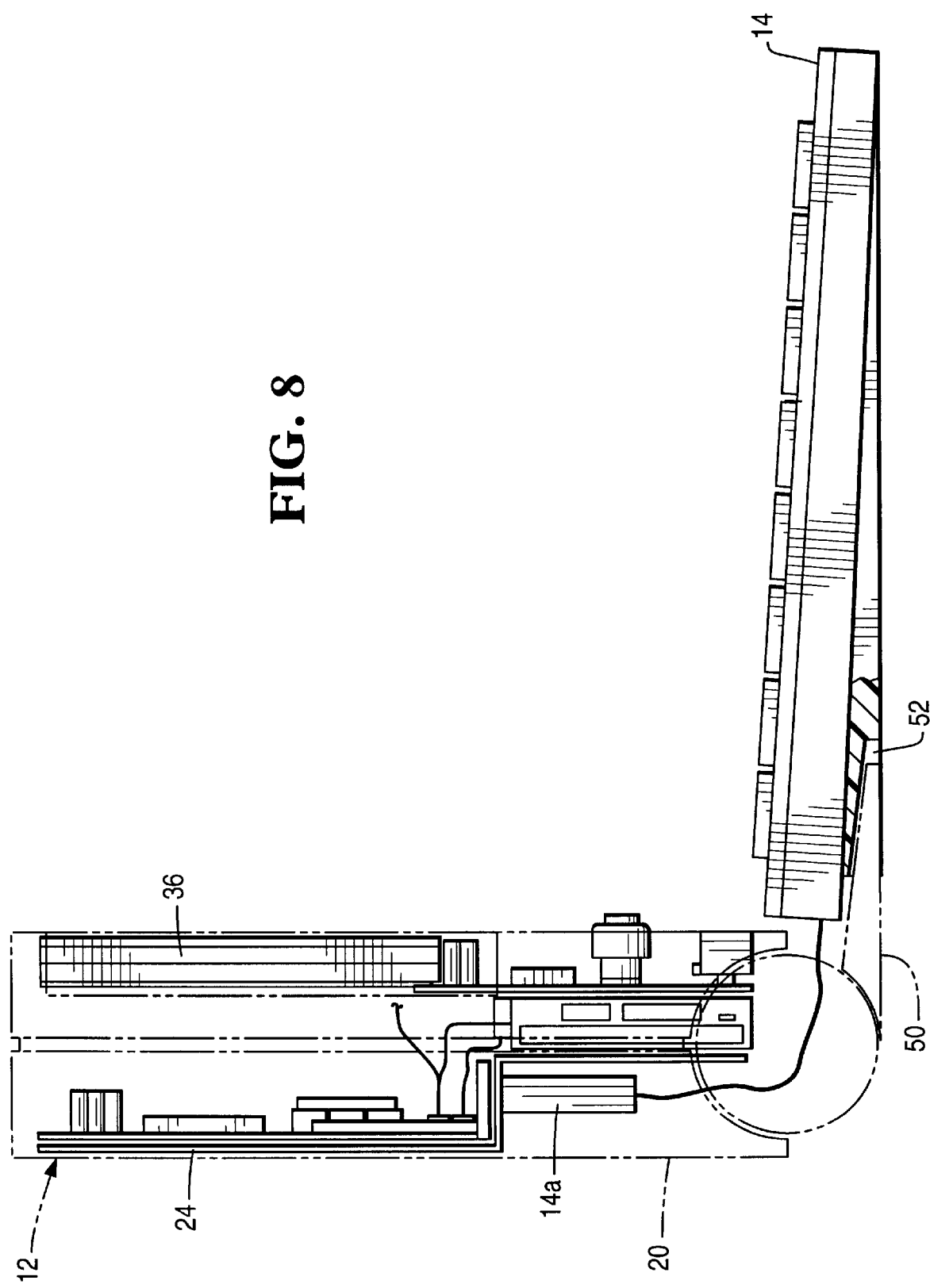
FIG. 8 is a side elevational, partly sectional view of the modular controller and keyboard illustrated in FIG. 7 and taken along line 8—8.

To improve stability of the terminal controller 12 and assembly with the keyboard 14, FIGS. 7 and 8 illustrate an alternate embodiment of the invention wherein the keyboard 14 includes respective pockets 52 which are complementary in configuration to the corresponding feet 50 for receiving and capturing the base feet 50 for joining together the controller 12 and the keyboard 14. The respective base feet 50 may be simply plugged into the mating pockets 52 in the keyboard 14 for providing an increased area base for supporting the terminal 12 in its vertical orientation.

Figure 9:
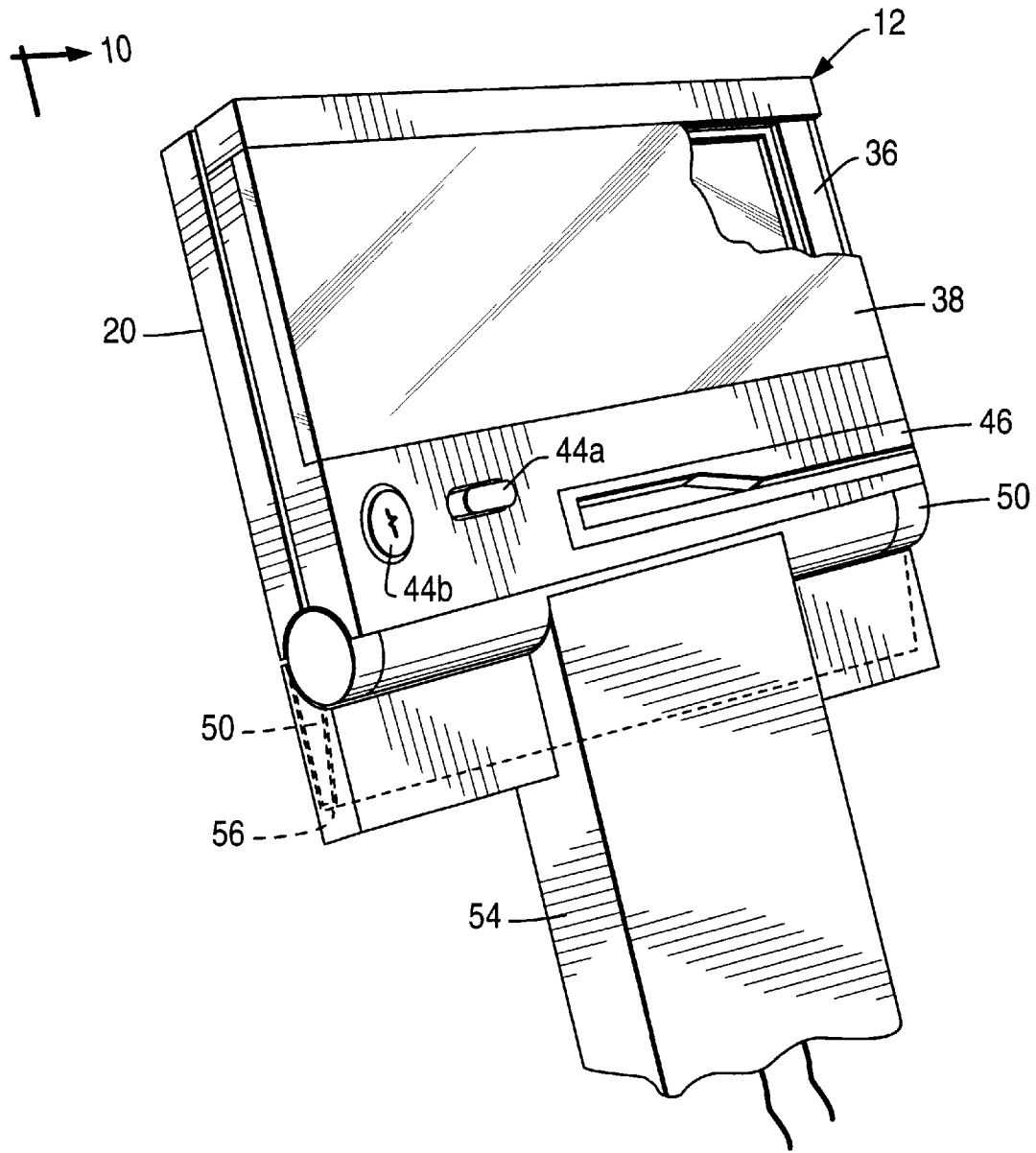
FIG. 9 is an isometric view of the modular controller illustrated in FIG. 1 in accordance with another embodiment configured for mounting atop a vertical post.
Figure 10:
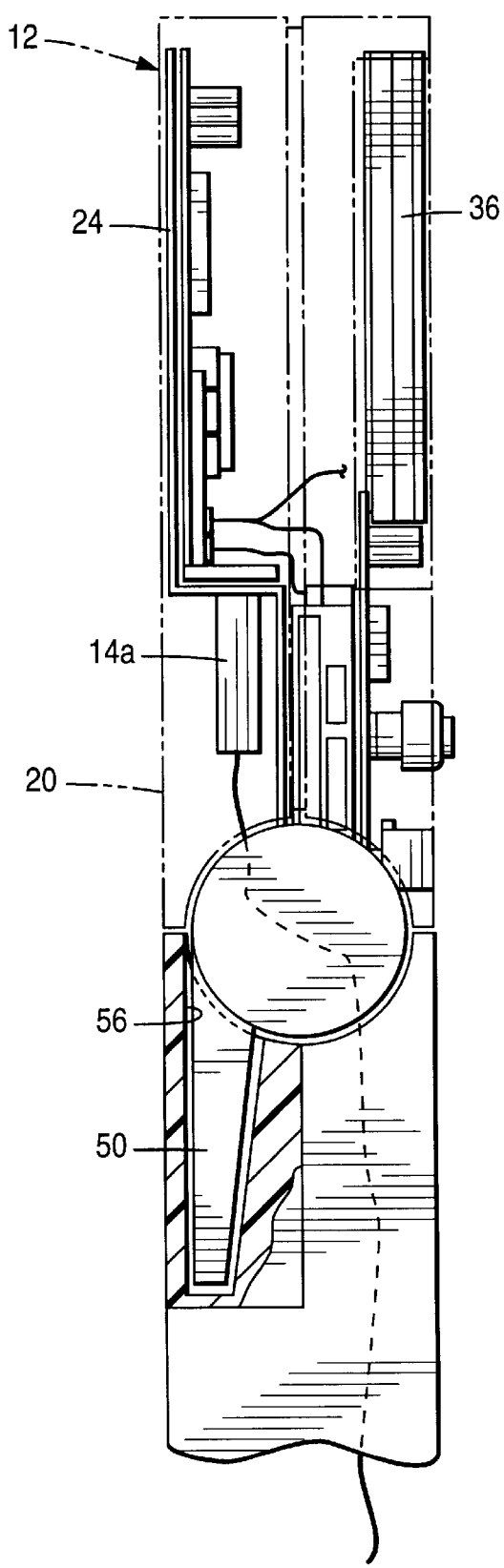
FIG. 10 is an elevational, partly sectional view of the post mounted modular controller illustrated in FIG. 9 and taken generally along line 10—10.

FIGS. 9 and 10 illustrate an alternate embodiment of the invention wherein the transaction terminal includes a vertical support post 54 suitably mounted at its base, and including corresponding pockets 56 at its top end for receiving and capturing the base feet 50 in a manner similar to that illustrated in the embodiment shown in FIGS. 7 and 8. In this way, the terminal controller 12 and display 36 are vertically supported atop the post 54, with the angular position of the display 36 being readily adjustable by the user.

In the various embodiments disclosed above, the combination of the display, mode switch, power switch, and MSR on the front cover reduces the number of external cables and connectors required, with simple internal connectors instead being used. A separate and dedicated electronic unit is eliminated by the integration of the main board 22 with the display 36. Different display technologies may now be readily incorporated with the common main board 22 and housing 20 to satisfy various retail locations and configurations. The installation and maintenance are improved since the main board 22 and cooperating components are readily accessible and are not hidden in inaccessible locations under a sales counter. Using the base feet 50 or other suitable arrangement, the transaction controller 12 may be readily attached to separate keyboards or vertical posts as described above.

The integrated terminal controller 12 now allows the transaction terminal 10 to be easily configured for different applications with reduced manufacturing and inventory costs. The housing 20 and components therein may have a single, common design for use with different front covers and corresponding displays. Selected pairs of different displays and covers may be assembled to the common housing 20 for readily changing front appearance and functional capability. The various covers are preferably identically sized and configured for mounting to the standard housing, and modified only as required for the specific type of display used.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A transaction terminal having a modular controller comprising:

a back housing having a front opening;

a processor main board mounted in said housing and having a central processing unit;

a front cover removably mounted to said housing and configured for enclosing said front opening;

an accessory board disposed inside said front cover, and including a display driver removably operatively joined to said main board for communicating data therebetween; and said cover being interchangeable with a different front cover for effecting a variety of different transaction terminal displays.

2. A terminal according to claim 1 wherein said cover further includes a visual display mounted thereto, and said display driver is operatively joined to said display.

3. A terminal according to claim 2 further comprising a magnetic stripe card reader mounted to said cover and operatively joined to said accessory board for reading data from a card for processing by said main board.

4. A terminal according to claim 2 wherein said central processing unit is configured to control all functions of said terminal including images presented on said display, with data being communicated in turn from said main board through said accessory board, display driver, and display.

5. A terminal according to claim 2 wherein said display and main board are integrated without a separate and dedicated electronic control unit for said display.

6. A terminal according to claim 2 further comprising a switch mounted to said cover and operatively joined to said accessory board for controlling operation of said main board.

7. A terminal according to claim 6 wherein said switch is an on-off switch.

8. A terminal according to claim 6 wherein said switch is a mode switch for controlling authorized access to different operating functions of said main board.

9. A terminal according to claim 2 wherein said cover and display are a substantial flat, integrated assembly.

10. A terminal according to claim 9 wherein said display is a touch screen display, and said accessory board is configured for communicating touch screen responses to said main board.

11. A terminal according to claim 9 further comprising a keyboard spaced from said modular controller, and operatively joined thereto.

12. A terminal according to claim 11 further comprising a memory disk drive mounted in said housing, and operatively joined to said main board.

13. A terminal according to claim 11 further comprising a base foot joined to said housing for supporting said housing, and being pivotable for adjusting viewing angle of said display mounted on said housing cover.

14. A terminal according to claim 11 wherein said keyboard includes a pocket for receiving and capturing said base foot for joining together said modular controller and said keyboard.

15. A terminal according to claim 11 further comprising a vertical support post including a pocket for receiving and capturing said base foot for vertically supporting said modular controller and display therein.

16. A terminal according to claim 11 further comprising:

a cash drawer operatively joined to said modular controller; and a transaction printer operatively joined to said modular controller.

17. A method of configuring a transaction terminal including:

a back housing having a front opening;

a processor main board mounted in said housing and having a central processing unit;

a front cover removably mounted to said housing and configured for enclosing said front opening;

an accessory board disposed inside said front cover, and including a display driver removably operatively joined to said main board for communicating data therebetween; and a visual display mounted to said cover, and operatively joined to said display driver, said method comprising;

providing a plurality of different, interchangeable front covers and corresponding different displays; and assembling to said back housing a selected pair of said front cover and corresponding display.

18. A method according to claim 17 wherein said plurality of front covers are identically sized and configured for mounting to said back housing.

* * * * *